United States Patent [19]

Liu

[11] Patent Number: 5,354,083
[45] Date of Patent: Oct. 11, 1994

[54] DRIVE SYSTEM FOR MUSCLE-POWERED EQUIPMENT AND VEHICLES, IN PARTICULAR BICYCLES

[76] Inventor: Qingshan Liu, Bogenstrasse 11, D-8000 Munchen 80, Fed. Rep. of Germany

[21] Appl. No.: 861,855
[22] PCT Filed: Dec. 18, 1990
[86] PCT No.: PCT/EP90/02230
§ 371 Date: Jun. 18, 1992
§ 102(e) Date: Jun. 18, 1992
[87] PCT Pub. No.: WO91/08943
PCT Pub. Date: Jun. 27, 1991

[30] Foreign Application Priority Data

Dec. 18, 1989 [DE] Fed. Rep. of Germany ....... 3941768

[51] Int. Cl.$^5$ ................................................ B62M 1/00
[52] U.S. Cl. ........................... 280/233; 280/224; 280/226.1; 482/62
[58] Field of Search ................ 280/224, 225, 233, 234, 280/235, 226.1, 62; 482/62, 66, 70

[56] References Cited

U.S. PATENT DOCUMENTS

| | | | |
|---|---|---|---|
| 516,786 | 3/1894 | Clark | 280/224 |
| 631,531 | 8/1899 | Sargent | 280/224 |
| 3,760,105 | 9/1973 | Dower | 280/233 |
| 3,979,135 | 9/1976 | Meritzis | 280/226 |
| 4,508,358 | 4/1985 | Erel | 280/234 |
| 4,639,007 | 1/1987 | Lawrence | 280/233 |
| 4,846,156 | 7/1989 | Kopnicky | 482/62 |
| 4,928,986 | 5/1990 | Carpenter | 280/234 |
| 4,941,673 | 7/1990 | Bennett | 280/112.2 |
| 4,953,880 | 9/1990 | Sudakoff et al. | 280/47.38 |
| 4,976,451 | 12/1990 | Kamenov | 280/233 |
| 5,125,677 | 6/1992 | Ogilvie et al. | 280/236 |

FOREIGN PATENT DOCUMENTS

| | | |
|---|---|---|
| 15868 | 12/1897 | Fed. Rep. of Germany . |
| 121860 | 8/1899 | Fed. Rep. of Germany . |
| 152339 | 1/1938 | Fed. Rep. of Germany . |
| 88425 | 4/1895 | Fed. Rep. of Germany . |
| 7423209 | 7/1974 | Fed. Rep. of Germany . |
| 2927675 | 2/1981 | Fed. Rep. of Germany . |
| 3516322 | 10/1986 | Fed. Rep. of Germany . |
| 3737294 | 11/1987 | Fed. Rep. of Germany . |
| 4001169 | 7/1991 | Fed. Rep. of Germany ........ 280/62 |
| 694365 | 4/1930 | France . |
| 698614 | 2/1931 | France ................. 280/225 |
| 974908 | 11/1948 | France . |
| 3132204 | 7/1982 | France . |

*Primary Examiner*—Margaret A. Focarino
*Assistant Examiner*—Kevin Hurley
*Attorney, Agent, or Firm*—Dykema Gossett

[57] ABSTRACT

Drive for muscle-powered vehicles and/or equipment, in particular bicycles, whereby hand-powered drive is accomplished by reciprocating rods whereas foot-powered drive is accomplished by pedals which are moved back and forth and their movement is transmitted to a cable or chain pull and, from the latter, via a freewheel system to the drive shaft, whereby steering is realized via the drive elements which are moved back and forth characterized by a) a seat drive comprising a seat (3) which may be moved back and forth on a track (3.12) extending in longitudinal direction of the bicycle, b) a seat backrest drive, in which the rocking motion of the backrest (3.1) is transformed, by means of a gear (3.4, 3.5, 3.6, 3.9), into a linear back and forth movement and which is superimposed by the drive motion resulting from the seat movement, c) a shoulder drive with a back rest (3.13) which may be swiveled around a shaft (3.1) positioned in a vertical longitudinal plane of the bicycle, and which is connected to a cable pull (4.1L, 4.1R), whereby the individual movements of all drives are being transmitted—by means of specifically associated transmission elements to the cable or chain pull, while the freewheel system in which a freewheel is provided for each drive and which combines all individual movements—to the drive shaft (5 or 9) and where they may be combined with each other by means of coupling elements.

43 Claims, 4 Drawing Sheets

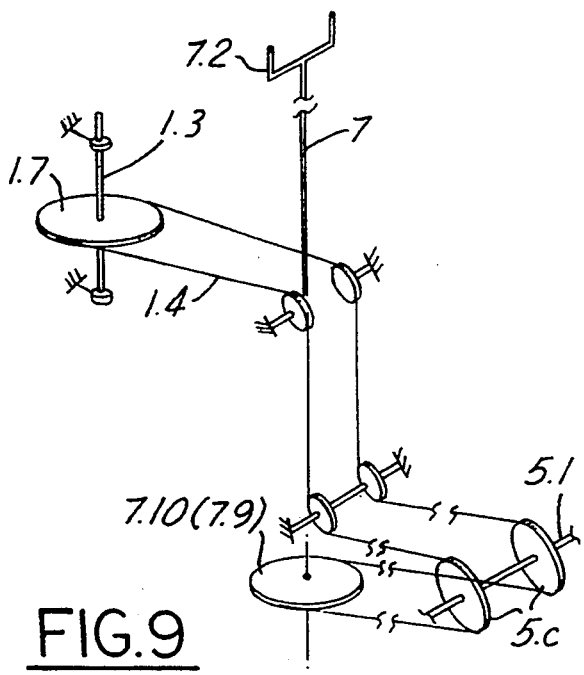
FIG.9
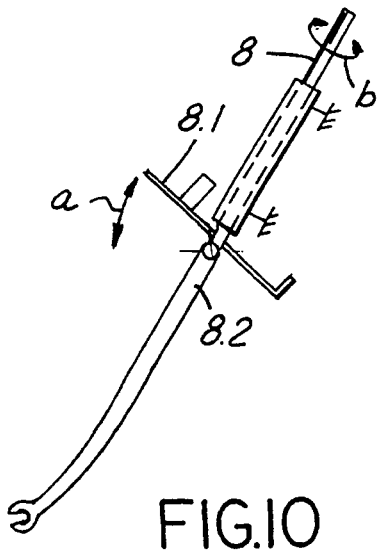
FIG.10
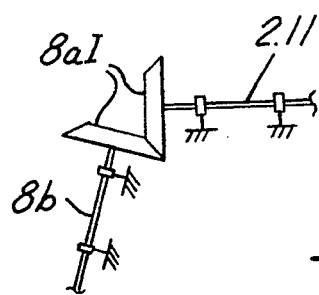
FIG.11A
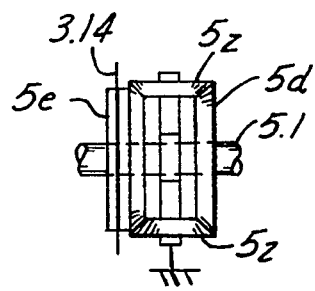
FIG.12
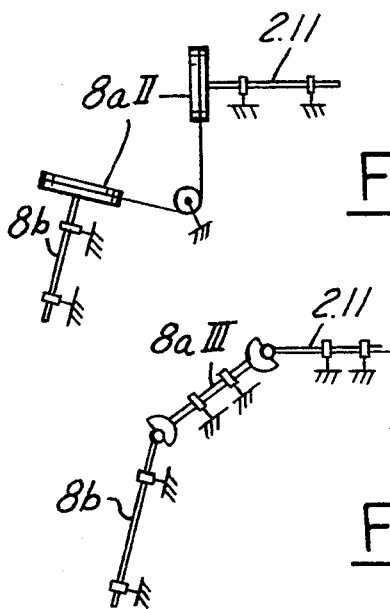
FIG.11B
FIG.11C
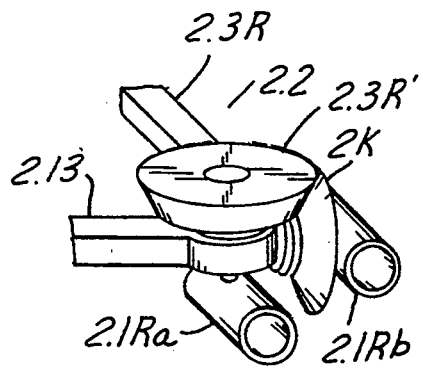
FIG.13

DRIVE SYSTEM FOR MUSCLE-POWERED EQUIPMENT AND VEHICLES, IN PARTICULAR BICYCLES

This invention relates to a drive system for muscle-powered vehicles and/or equipment, in particular bicycles.

Various suggestions have been made for using the muscles of a bike rider in numerous ways to drive a bicycle or the like in order to thus optimize drive performance. For instance, the state of the art involved in this particular area, according to DE-OS 3737294, uses foot pedals connected to a cable pull, with the movement of said pedals being transmitted to the rear wheel via freewheels. At the same time, the pedals are connected via two longitudinal rods to a steering device that pivots back and forth around a vertical shaft. This couples the foot-powered drive component with the hand-powered drive component. However, this coupling permits only a simultaneous movement of the arms and legs in the same direction for the purpose of achieving drive motion. This prohibits movement in the opposite direction or resting of either arms or legs separately. In addition, the rods actually enclose the driver, thus impeding the dismounting, especially in critical situations. The connection of the pedals with the steering device also has a negative effect on the steering action.

DE-PS 88425 reveals a bicycle drive in which the seat of the rider pivots longitudinally around a low point on the frame. This pivoting motion is transmitted to the rear wheel via a chain and freewheels. For this purpose, the rider is belted to the seat. Feet and hands are braced against corresponding bracing parts of the frame. By means of a drawing motion of the arms, the torso and thus the belted-on seat backrest are moved forward resulting in a forward pivoting motion of the seat. During the back pivot, this movement is supported by the extension of the legs. This type of seat drive uses primarily the arms of the rider while the leeway of the legs is restricted.

In another seat drive according to U.S. Pat. No. 3,979,135, the seat may be moved longitudinally along an arc-shaped track. This back and forth movement of the seat is achieved in that the rider is able to brace himself on foot rests that are affixed to the frame and moves the seat by extending his legs and arms that are braced against the frame or the steering device. The seat is connected to the rear wheel via a chain pull and a freewheel system. The weight of the rider exploits the curved design of the track to support this movement.

All of these different drive systems have the disadvantage that only particular body parts are used for the drive or, if the entire body is moved, that the achieved drive performance is not proportional to the effort of the individual parts of the body.

Accordingly, the purpose of the invention is to create a drive in which the movements of the body parts, without any disadvantageous reciprocal effect, may be used effectively as comprehensively as possible for the drive so as to be able to increase the drive force in proportion to the used body parts and to considerably increase the riding time. In addition, the drive motions should not be affected by the steering.

In this way, a drive system is created that makes sensible use of the existing main muscle group forces of a rider and at the same time makes it possible to combine the individual drive components with each other as desired.

The invention contains advantageous improvements. For example, in the foot-powered drive, the drive force is independent of the weight of the rider because of the pivoting motion of the pedals around a vertical axis. The circular-arc-shaped movement of the pedals in the horizontal plane enables good utilization of the leg muscles.

The foot-powered drive with lineal pedal motion makes it possible to use muscle power optimally. It is also possible to separate a pedal from the associated cable pull and to affix it to the other pedal in order to achieve a leg movement in the same direction.

The construction of the foot-powered drive permits adaptation to the structural factors.

All foot-powered drive versions permit an uncoupling of the drive in such a way that the pedals only have a supporting and resting function.

The hand-powered drive enables various movements of hands and arms that may e.g. be forward and backward and they may be synchronous with the leg movements. But the arms may also be moved apart and towards each other sideways. Steering is independent of the hand-powered drive.

The reversing coupling enables movement of hands and feet in the same or opposite direction. It also permits turning off the hand-powered drive in such a manner that the latter will free-wheel. It may also be affixed to the frame via yet another coupling.

The positioning of the operating rods makes it possible to move the arms in a vertical longitudinal plane, whereby this movement takes place in the same or opposite direction.

The seat drive may be activated solely by leg power. Because of the linear seat movement, the latter is independent of the rider's weight; in particular, the pivoting force of the rider required for the state of the art is no longer necessary here. This utilization of the pivoting force of course is no longer possible when riding up inclines.

The backrest drive represents an additional drive component that is superimposed on the seat drive component. But it is also possible to lock the seat on the frame so that it is comparable to a conventional bicycle seat and the backrest may be moved independently of the seat and its position. In this case it is useful to provide both backrest and seat with a belt. This, for example, enables a handicapped rider to drive the vehicle by operating the backrest drive alone. It is also possible to combine the movement of seat and backrest in various ways, for example, in that the seat is moved forward while the backrest simultaneously tilts forward; in the same way, during the backward movement of the seat, the backrest may tilt backward. In both cases, the generated drive forces are superimposed. Naturally, an opposite motion of seat and backrest is also possible. These movements enable optimum utilization of the stomach and back muscles.

The backrest drive requires special utilization of those muscles that are usually not stressed very heavily. By uncoupling the ring handles from the backrest, it is also possible to operate these handles with the hands, and, if necessary, by means of other body parts.

The transmission for the hand-powered and foot-powered drives enables synchronization of hand-powered and foot-powered drives in such a manner that these movements occur harmoniously. The arrangement of the connection between hand-powered and foot-powered drive, which is disadvantageous in the state of the art, is thus avoided.

The cable pull for the hand-powered drive permits both a weight saving by shortening the transmission shaft and construction of the drive in any desired manner.

The construction between the foot-powered drive and the hand-powered drive makes it possible that the hand-powered drive gear may be used for steering.

But it is also possible to couple the hand-powered drive gear to the frame in such a way that no steering takes place. This is accomplished with foot pedals provided at the front wheel fork. That means that a rider may steer the bicycle without using his hands.

The invention thus creates a muscle-powered drive for vehicles that may be used in many different ways. The cooperation of the individual drive components (arms, legs, shoulders, pelvis-torso, etc. ) enables optimum utilization of existing main muscle group forces. Compared to the state of the art this results in a considerably higher overall performance. But it is also possible, by using only individual drive components—by themselves or combined in different ways—to utilize certain body parts and resting the others. In this way, the riding duration may be extended considerably.

Another possibility consists of the fact that, for example, arm or leg amputees may use the bicycle or the equipment by employing the corresponding drive components, especially since steering may take place, as needed, by hands or feet. The drive according to the invention also enables such persons to use the various muscle groups as desired by designing the components correspondingly.

The drive may be used in various vehicles, including water craft and aircraft. Another field of application consists of various types of training equipment for physical fitness.

Above, we described cable pulls and chain pulls for transmitting the motions of diverse drives to the drive shaft. These are not the only possibilities; rather it is possible to generally implement the invention with motion transmission means, for example, also belt drives, hydraulic transmission means, and others.

Embodiments of the invention are described below using the drawing:

FIGS. 8 and 9 show other possibilities for the transmission of the hand-powered and foot-powered drives;

FIG. 10 shows the foot pedals for steering and braking at the front wheel fork;

Figure 6A:
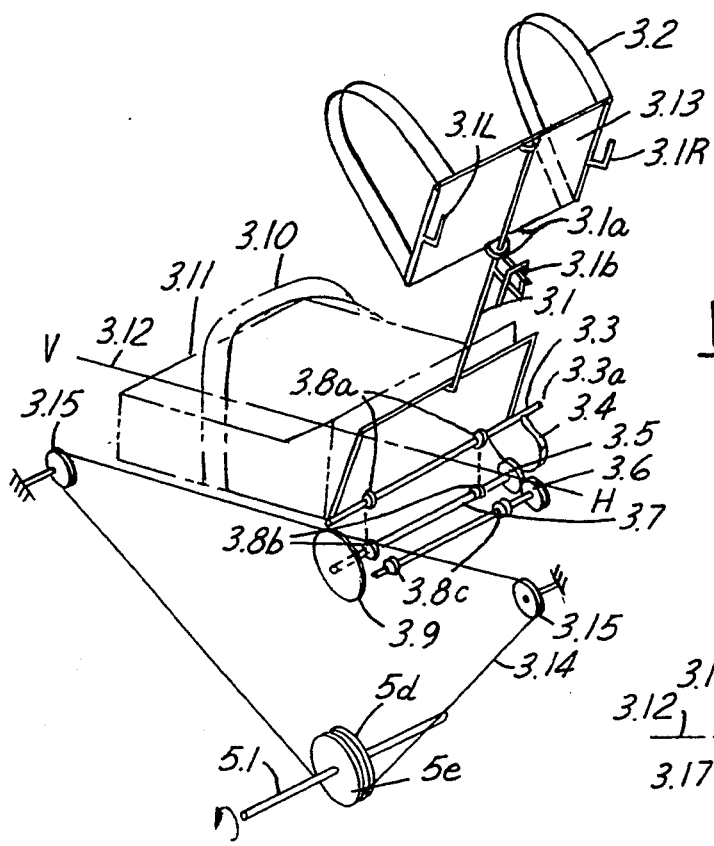
FIG. 6A shows a seat and backrest drive.

FIGS. 11A through 11C embodiments of the transmission systems of the steering system;

FIG. 12 shows a detailed view of the freewheels in FIG. 6A;

FIG. 13 shows a variation of the hand-powered drive gear.

Figure 1:
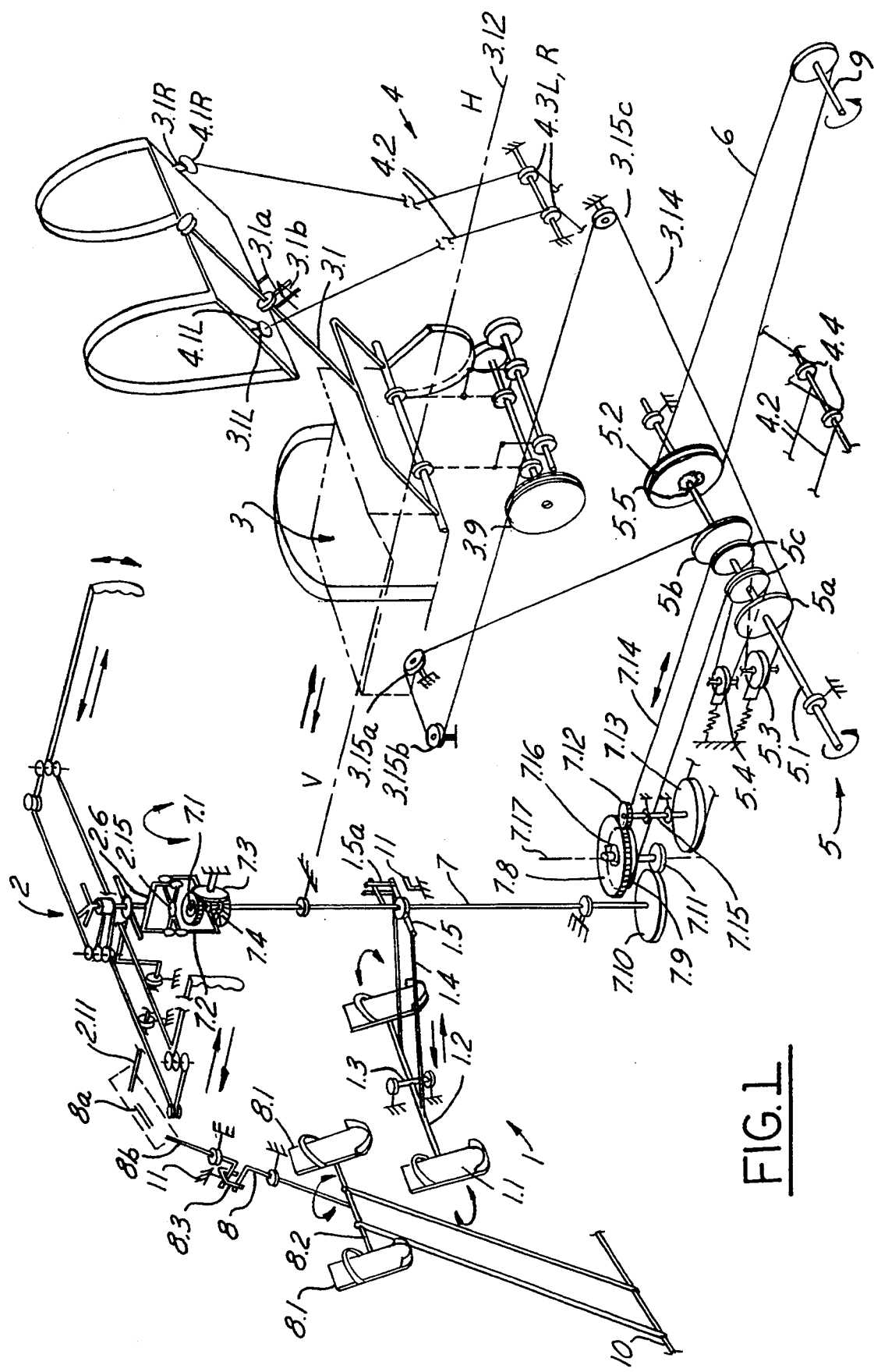
FIG. 1 is a schematic portrayal of the drive system.

The drive system shown in FIG. 1 consists of a pedal drive 1, a hand-powered drive 2, a seat-backrest drive 3, and a shoulder drive 4. These drives are transmitted via a freewheel system 5 and a chain or belt 6A to the drive shaft 9. Steering is accomplished via the front wheel fork 8.

The foot-powered drive system 1 shown in FIG. 1 consists of the foot pedals 1.1 that are moved back and forth by the feet. These foot pedals are connected in an articulated manner with a rod 1.2. Rod 1.2 is positioned rotatably on the frame in its center at 1.3. At a distance from this rotation point 1.3, two traction cables 1.4 are attached to rod 1.2 and are connected by their other ends to a two-armed lever 1.5. This lever 1.5 is selectively connected via a coupling 1.5a to a shaft 7. To stop the pedals 1.1, the coupling 1.5a is selectively connected to the frame 11. It is also possible to move the coupling 1.5a into an intermediate position in which the pedals 1.1 may be moved without causing a drive movement.

Figure 5:
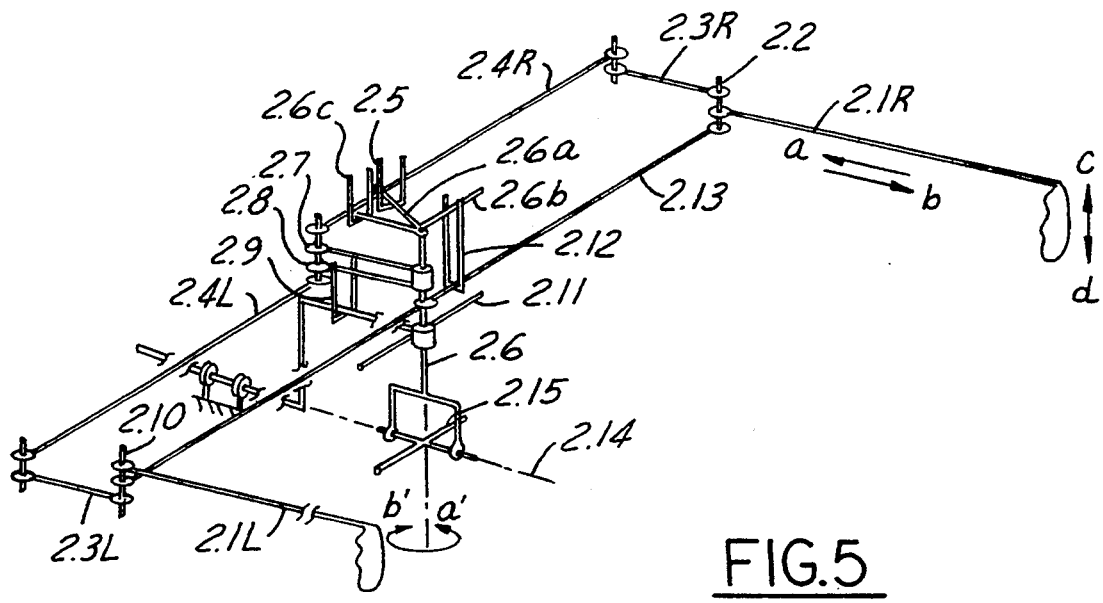

The hand-powered drive 2 of FIG. 1 which is shown enlarged in FIG. 5 consists of two rods 2.1L, 2.1R, that have operating handles at their free ends.

Rods 2.1R, 2.1L, which are moved back and forth, transmit this motion via joints that have joint shafts labeled 2.2 and 2.10 to a cross bar 2.13. The latter is positioned rotatably in its center on a shaft 2.6. The cross bar 2.13 is selectively connected via a coupling 2.12 by means of a part 2.6b to the shaft 2.6 in a rotation-proof manner. Shaft 2.6 has a cardan joint part 2.15 at its lower end. At the joint shafts 2.2 and 2.10 the rods 2.1R and 2.1L are selectively connected in a rotation-proof manner to a rod 2.3R and 2.3L respectively. A gear set 2.4R and 2.4L is linked respectively to the free ends of rods 2.3R and 2.3L. The inward-pointed ends of gear set 2.4R and 2.4L are connected in an articulated manner to a rod part 2.7 or 2.8 whose other ends are selectively connected to each other in a rotation-proof manner. A coupling 2.9 also connects rod part 2.8 to a bearing shaft 2.11. The latter supports a bearing for shaft 2.6 and also pivots around the frame 11 (pivot axis 2.14).

Figure 4:
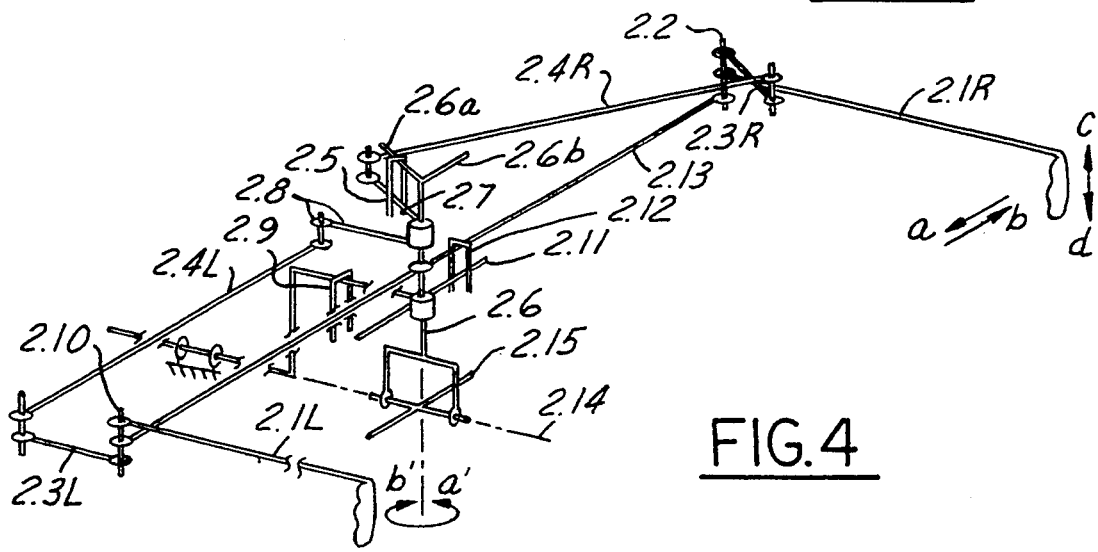
FIGS. 4 and 5 are embodiments of the hand-powered drive.

FIG. 4 shows a modified version of the hand-powered drive shown in FIG. 5. Here we note the following modifications compared to FIG. 5:

Rod 2.3R is arranged in a manner turned inward when compared to the position shown in FIG. 5. At the same time, rod part 2.7 is also twisted with respect to part 2.8, as is seen from FIG. 4. Rod part 2.7 is selectively connected, by means of a coupling 2.5, to shaft 2.6, with part 2.6a being interposed. In this way, parts 2.8, 2.7 and 2.6 are connected to each other in a rotation-proof manner. Rod part 2.8 in this case is uncoupled from bearing shaft 2.11, specifically, by releasing the coupling 2.9. Cross bar 2.13 is coupled with bearing shaft 2.11 by coupling 2.12. Bearing shaft 2.11 does not rotate in the horizontal plane. Because of the coupled connection, cross bar 2.13 likewise does not rotate in this plane. Cross bar 2.13 is only able to rotate together with bearing shaft 2.11 around shaft 2.14 in the frontal plane, something necessary to steer the front wheel.

With this combination, it is possible to use both the movement together (arrow a) and apart (arrow b) of both hands for the drive (see arrow a', b').

Three different motion processes of the hand-powered and foot-powered drives are made possible by coupling 7.2a:

If the right pedal is moved forward, the right hand motion is independent in the first position from the foot motion; while in the second position the right hand moves toward the rear, i.e. in the opposite direction, and in a third position, the hand moves in the same direction.

Figure 2:
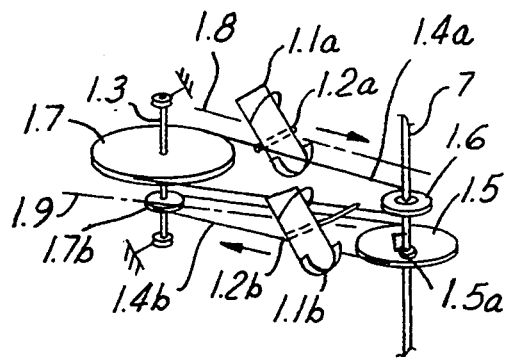
FIGS. 2 and 3 are embodiments of the foot-powered drive.

FIG. 2 shows another possibility for the foot-powered drive. Instead of moving around shaft 1.3 in FIG. 1 on an (albeit approximately linear) circle segment, the feet, in this possibility shown in FIG. 2, may move along a completely linear path.

In the embodiment the pedals 1.1a and 1.1b are each connected in an articulated manner to a catch 1.2a and 1.2b that is attached to a chain or cable 1.4a. Catches 1.2a and 1.2b move along linear paths 1.8 and 1.9. Chain 1.4a, on one side, is looped around a wheel 1.6 that rotates on shaft 7 and, on the other side, is looped around a wheel 1.7 positioned on shaft 1.3. Shaft 1.3 is positioned on the frame and has a second wheel 1.7b. The latter is actively connected via a chain 1.4b to a wheel 1.5 that rotates on shaft 7 and that is selectively connected to said shaft via a coupling 1.5a. In this construction, likewise, the pedals are selectively rigidly connected to the frame via coupling 1.5a so that they will serve only as foot rests.

A foot movement in the same direction is also possible. For this purpose, one of the catches, for example, 1.2a, must be uncoupled from chain 1.4a and must be connected to the other one. In this way, the force of the right foot may be superimposed on the left one. In contrast to the illustration in FIG. 2, the lower chain drive may be eliminated. In this case, coupling 1.5a must be connected merely to wheel 1.6.

Figure 3:
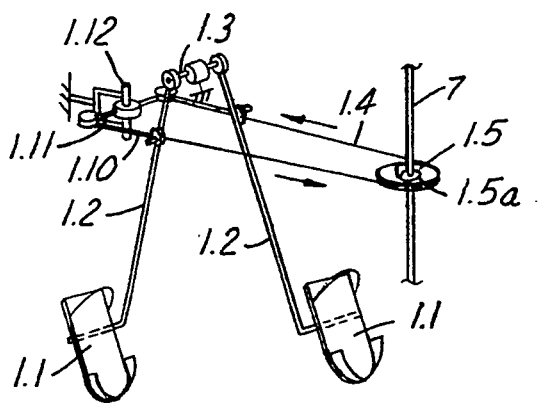

FIG. 3 shows a pedal drive known per se. Here, pedals 1.1 are each positioned on a rod 1.2 that selectively swivel around a shaft 1.3 that is affixed to the frame. In the area facing away from the pedals 1.1, a chain 1.4 is fastened to the rods 1.2, whereby the former is connected to wheel 1.5 that is selectively coupled to the shaft 7 or to the frame. So that a drive force will be present also during the backward movements of rods 1.2, a connecting element 1.10 is linked to each rod 1.2. Said connecting element is fastened to a lever 1.11 that is positioned in the center in an articulated manner on the frame via a shaft 1.2.

FIG. 6A shows the seat drive system that also integrates a seat backrest and a shoulder drive. The seat drive is realized by the back and forth movement of the seat 3.11 on a track 3.12. Track 3.12 extends in a longitudinal direction along frame 1, as shown in FIG. 1. The rider is held here on the seat 3.11 by a belt 3.10. This seat movement is transmitted by a wheel 3.9—that is positioned on the seat bottom and around which is looped a cable or a chain 3.14—via this cable 3.14 to a central shaft 5.1 of the freewheel system 5, as long as there is no movement of the backrest (frame part 3.1) relative to the seat.

Wheel 3.9 is connected in a rotation-proof manner to a shaft 3.7 that rotates at the seat bottom in bearings 3.8b. At the other end of shaft 3.7 a gear wheel 3.5 is provided that engages another gear wheel segment 3.4 that is connected in a rotation-proof manner to the backrest frame on a shaft 3.3. Shaft 3.3 is rotatably positioned on seat 3.11 by means of bearing 3.8a. If the backrest is tilted e.g. forward, it causes, according to FIG. 6A, the wheel 3.9 to turn clockwise via gear wheels 3.4 and 3.5, as well as shaft 3.7. As a result, the cable pull 3.14 is pulled backward with relation to the seat.

Figure 6B:
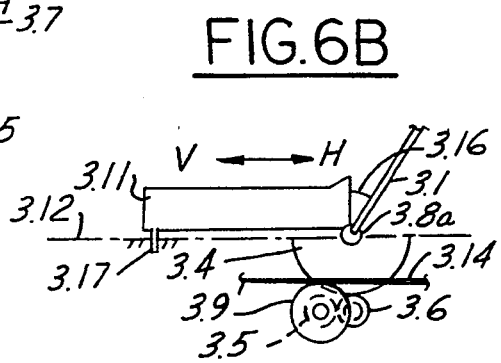
FIG. 6B shows a possible combination of the seat and backrest drive where it is possible to lock the seat and-/or the backrest.

The shaft with gear wheel 3.6 shown in FIG. 6A is actually part of the version according to FIG. 6B.

FIG. 6B, shows another movement combination of seat and backrest drive. Gear wheel 3.6 is directly in contact with gear wheel segment 3.4, also with gear wheel 3.5. When the backrest frame part 3.1 is tilted forward (direction V), then gear wheel 3.6 is turned clockwise and, as a result, gear wheel 3.5 and wheel 3.9 are turned counterclockwise, so that the cable 3.14 is pulled forward relative to the seat.

If the seat 3.11 is not braked on track 3.12 by a brake 3.17 and if the backrest 3.1 is also freely moveable relative to the seat 3.11, then the back and forth movement of the seat 3.11 is superimposed with the tilting motion of the backrest 3.1. If the seat 3.11, on the other hand, is firmly connected to the frame by a braking system 3.17, then the seat is no longer mobile. If the back rest 3.1 also is firmly connected to the seat 3.1 by a locking device 3.16, then both of them are no longer mobile. In this case, the seat 3.11 only fulfills a sitting function and supports other drive systems. In addition, the seat may be adjusted continuously using locking systems 3.16 and 3.17. The adjustable range corresponds to the drive movement range.

Shoulder drive 4: (FIG. 1 )

Two ring handles 4.1L and 4.1R selectively hooked into the backrest at 3.1L, 3.1R. By moving the shoulders back and forth around axis 3.1 that is independent of the backrest drive motion, the cables 4.2 are pulled whereby this motion is transmitted to the freewheel system 5. In the case shown in FIG. 1, the cable 4.2 is connected to the wheel 7.13 whose rotation motion is transmitted via the translation system 7.15, 7.12, 7.18, and coupling 7.16 to the wheel 7.9, and by the cable 7.14 to freewheels 5c. The assumption here is that coupling 3.1b is released from the backrest 3.1.

When not coupled to the backrest, the ring handles 4.1L and 4.1R may also be operated by other body parts, for example, hands or feet. Deflection rollers 4.3L and 4.3R here must be adapted to the most favorable position in each case. This makes it possible to perform many different motions of the arms and legs in various combinations.

Fastening of the torso with belts 3.2 is practical for backrest and shoulder drive.

Freewheel system 5:

As shown in FIG. 6A, cable 3.14 is connected to freewheel 5e. If the seat 3.11 is moved backward, freewheel 5e is driven clockwise by cable 3.14, i.e. in this case against driving direction (freewheel). The construction shown in FIG. 12 causes the two freewheels 5e and 5d to always work in the opposite direction, i.e. the central shaft 5.1 is always driven by one of the two freewheels.

The seat drive system shown in FIG. 1 drives the cable 3.14 back and forth. The cable 3.14 that is connected to freewheel 5a is guided via deflection roller 5.3, freewheel 5b, via deflection rollers 3.15a, 3.15b, back to the wheel 3.9. If the wheel 3.9 turns in direction V or is moved in that direction by the seat 3.11, the cable 3.14 is pulled upward and to the rear between deflection roller 3.15c and freewheel 5a. Freewheel 5a drives the shaft 5.1 in the driving direction. In the case of a rotation and/or movement of wheel 3.9 in direction H, the freewheel 5b effects the drive.

The central shaft 5.1 is positioned at the frame 11 by means of shaft bearings. Deflection wheels 5.3, 5.4 are also affixed or elastically attached by springs to the frame. A drive wheel 5.2 that is selectively coupled in a rotation-proof manner with shaft 5.1 by means of a coupling 5.5 is positioned on the central shaft 5.1. From the wheel 5.2, the drive force is transmitted to the rear wheel 9 via a chain 6. The drive is selectively uncoupled using coupling 5.5 (for example, when the bicycle is pushed backward). It should also be mentioned that at the lower end of shaft 7 a gear wheel 7.10 is attached which transmits the rotary motion of shaft 7 to free wheels 5c via a translation 7.1 [illegible] and 7.9.

The rotation movement of the bearing shaft, which is positioned on the frame, is transmitted, by a transmission system 8a (for example, bevel gear pair 8aI, cable pulley 8aII, cardan joint shafts 8aIII, see FIGS. 11A through 11C) to a shaft 8b via coupling 8.3 (see FIG. 1) and to the front wheel fork 8. 8.1 refers to a foot steering pedal (see also FIG. 10) which may also be used for braking. Pedal 8.1 rotates on an axle 8.2 of the fork 8. Arrow a indicates the braking movement and arrow b shows the steering movement of pedal 8.1.

Part 10 is the front wheel axle that may be attached to the end of fork 8.

Figure 7A:
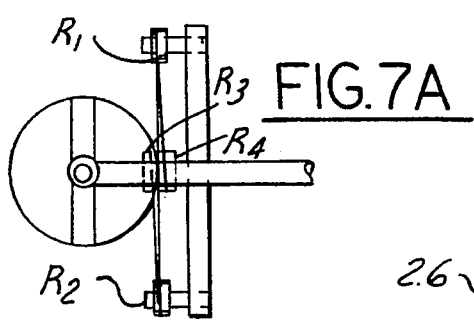
FIGS. 7A through 7C show a variation of the hand-powered drive.
Figure 7C:
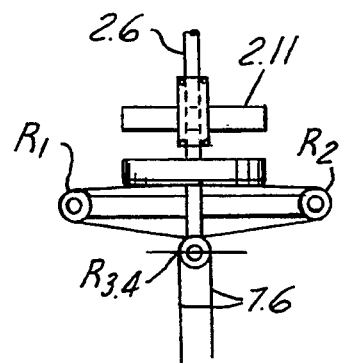
Figure 7B:
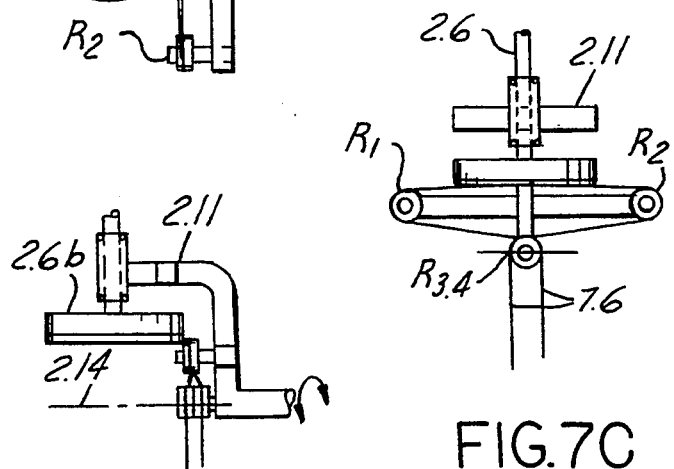

FIGS. 7A through 7C shows another possible hand-powered drive system 2:

The back and forth movement of shaft 2.6 is converted by a pulley 2.6b around which the cable 7.6 is wound via deflection rollers R1 to R4, into a back and forth motion. In this context it is important that rollers R3 and R4 are coaxial with axle 2.14 and beating shaft 2.11. As a result, the drive movement is practically also independent of the steering motion.

Figure 8:
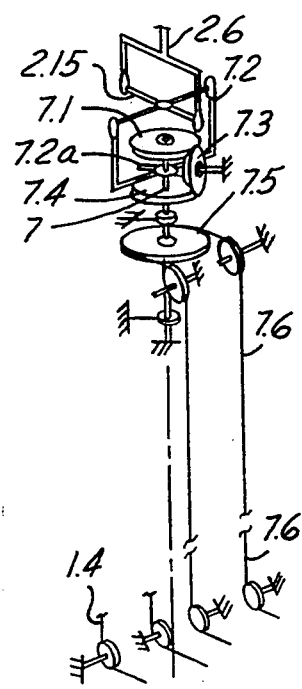

FIG. 8 furthermore shows another possibility of transmitting the movement from the hand-powered drive system via a deflection roller 7.5 and a cable or chain pull. In this way, it is possible to make allowances for structural conditions in a simple, weight-saving manner.

FIG. 9 shows another possibility of transmitting the hand-powered and foot-powered drives, plus another combination of those two drives. Here, cable 1.4—in contrast to what is shown in FIGS. 1 to 3—is not connected directly to shaft 7 (for example, by means of 1.5 and 1.5a); instead, it is directly connected via rollers to freewheels 5c and, thereafter, to wheel 7.10 (or wheel 7.9).

FIG. 13 shows a modification of the hand-powered drive according to FIGS. 1, 4, and 5, with the possibility of pivoting rods 2.1R and 2.1L in the same direction or in the opposite direction, in a plane parallel to the longitudinal axis of the bicycle. The pedals (for example, FIG. 10) are necessary for steering this version. In this case, the hand-powered drive system 2 must be firmly connected to the frame by coupling 8.3, and the cross bar 2.13 must be coupled with bearing shaft 2.11 by means of coupling 2.12. As a result, cross bar 2.13 is no longer moves relative to the frame. In the process, coupling 2.6c (FIG. 5) must be connected with rod part 2.7 and thus also with part 2.8 (if moving in opposite direction); in case of pivoting in the same direction, on the other hand, coupling 2.5 must be connected to rod part 2.7, as shown in FIG. 4.

I claim:

1. A muscle-powered drive mechanism for vehicles and other equipment with at least two drive components operated independently from each other and the drive movements of which are adapted to be transmitted to a drive shaft using a movement transmission system, comprising:

a first drive component formed by a seat backrest drive mechanism whose drive movement is generated by a rotational movement of a seat backrest relative to a seat surface; and at least one of (a) a drive component formed by a seat surface drive mechanism whose drive movement is generated by a reciprocating translation movement of the seat surface on a track extending in a longitudinal direction of the muscle-powered drive mechanism, whereby the rotational movement of the seat backrest is superimposed on the translation movement of the seat surface using a transmission means and a freewheel system for a combined drive of the drive shaft;

(b) a drive component formed by a foot-powered drive mechanism whose drive movement is generated by a reciprocating movement of at least one pedal, whereby the rotational movement of the seat backrest is superimposed on the reciprocating movement of the pedal using a transmission means and a freewheel system for a combined drive of the drive shaft; and (c) a drive component formed by a hand-powered drive mechanism with hand-operated rods (operating rods) whose drive movement is generated by a reciprocating movement of the operating rods whereby the swivel movement of the seat backrest is superimposed on the reciprocating movement of the operating rods using a transmission means and a freewheel system for a combined drive of the drive shaft.

2. The device according to claim 1, including the seat surface drive mechanism and the foot-powered drive mechanism.

3. The device according to claim 2, wherein the pedal of the foot powered drive mechanism moves in a horizontal plane.

4. The device according to claim 2, including the hand-powered drive mechanism.

5. The device according to claim 1, including the foot-powered drive mechanism and the hand-powered drive mechanism.

6. The device according to claim 5, wherein the pedal of the foot powered drive mechanism moves in a horizontal plane.

7. The device according to claim 1, including the foot-powered drive mechanism, wherein the pedal of the foot-powered drive mechanism moves in a horizontal plane.

8. The device according to claim 7, including a rod, a first shaft, a coupling and a second shaft, wherein the foot-powered drive mechanism comprises the rod rotating about the first shaft and the pedals positioned on the rod in an articulated manner, whereby the rod holds at a lateral distance from the first shaft a first transmission means which ends at a lever selectively connected using the coupling to the second shaft which in turn transmits the movement to a second transmission means and the freewheel system.

9. The device according to claim 1, including the foot-powered drive mechanism, wherein the pedal of the foot-powered mechanism moves linearly.

10. The device according to claim 1, wherein the foot-powered drive mechanism comprises two pedals, a transmission means, and a shaft, said transmission means transmitting movement of the pedal to the shaft.

11. The device according to claim 10, wherein the shaft transmits the linear pedal movement using a second transmission means to the associated freewheel system.

12. The device according to claim 10, wherein the cable pull is one of a chain and a wire.

13. The device according to claim 1, the foot-powered drive mechanism including, a lever with opposing ends, a first transmission means, a cable pull, a deflection roller, a coupling, and a shaft, wherein the foot-powered drive mechanism comprises two pedals, each of which moves back and forth on the lever, whereby the first transmission means, using a cable pull, is attached to the lever which carry the pedals on the opposing ends and the cable pull runs over the deflection roller which is selectively connected using the coupling to the shaft.

14. The device according to claim 13, wherein the shaft is used to transmit pedal movement using a second transmission means to the associated freewheel system.

15. The device according to claim 13, wherein the cable pull is one of a chain and a wire.

16. The device according to claim 1, including the hand-powered drive mechanism, wherein the operating rods are used to steer the device.

17. The device according to claim 1, including the hand-powered drive mechanism, wherein the operating rods of the hand-powered drive mechanism are adapted to move apart and together.

18. The device according to claim 1, wherein the operating rods of the hand-powered drive mechanism are adapted to move in a direction parallel to a longitudinal axis of the device.

19. The device according to claim 1, wherein the operating rods of the hand-powered drive mechanism are adapted to move in a direction transverse to a longitudinal axis of the device.

20. The device according to claim 1, including the hand-powered mechanism, wherein the operating rods of the hand-powered drive mechanism move in an approximately vertical plane of the device.

21. The device according to claim 20, including holders, bevel wheels and extension rods wherein each of the operating rods are held in one of the holders, which are selectively connected to the extension rods using the bevel wheels.

22. The device according to claim 1, the seat surface drive mechanism including, a shaft, and a cable pull, wherein the first shaft is positioned in relationship to the seat surface at one end of which a wheel is attached in a torsion-proof manner, whereby the wheel engages with the cable pull which is passed over the freewheel system.

23. The device according to claim 1, the device further comprising a frame, wherein the seat surface is selectively locked to the frame.

24. The device according to claim 1, wherein the seat backrest is locked to to seat surface.

25. The device according to claim 1, the seat backrest drive mechanism including, an upper backrest, a shaft, and a coupling, wherein the upper backrest of the seat backrest is adapted to selectively rotate about the shaft out of the plane of the seat backrest and is positioned so that it is selectively coupled with the shaft using the coupling.

26. The device according to claim 25, wherein a transmission means selectively transmits movement of the upper backrest about the shaft to the freewheel system.

27. The device according to claim 25, wherein the backrest seat drive mechanism includes ring handles, body extremities fitting through the ring handles to provide the reciprocating movement.

28. The device according to claim 1, wherein the movement transmission system includes a gear wheel, a shaft, and a translation system, the gear wheel connected in a torsion-proof manner to a bottom end of the shaft which is connected to the translation means leading to the freewheel system.

29. The device according to claim 1, the device including the hand-powered drive mechanism, where the hand-powered drive mechanism includes a pulley, a shaft, and a cable pull, wherein the pulley is positioned in a torsion-proof manner at the shaft using the cable pull.

30. The device according to claim 1, wherein the hand-powered drive mechanism includes a reciprocatable rotatable shaft, a cable pulley and a cable pull, wherein the reciprocating rotary movement of the shaft is adapted to transmit the drive movement of the hand-powered drive mechanism to the freewheel system using the cable pulley positioned on the shaft in conjunction with the cable pull connected to the cable pulley.

31. The device according to claim 1, the freewheel system including a freewheel with two coaxially arranged freewheel wheels and intermediate wheels of which one of the freewheel wheels is driven, and which transmits the drive via the intermediate wheels and the other of the freewheels wheels.

32. The device according to claim 1, including a bearing shaft, transmission elements, a coupling, a front wheel fork and lateral foot pedals, wherein the bearing shaft is adapted to be selectively connected for the transmission of a rotary movement using the transmission elements and the coupling with the front wheel fork.

33. The device according to claim 1, wherein the transmission means comprises a gearing set.

34. The device according to claim 1, wherein the hand-powered drive mechanism includes:
a cross-bar with opposing ends selectively rotatable about a shaft.

35. The device according to claim 34, wherein the drive mechanism includes a cardan joint connected to the shaft adapted to transmit movement of the operating rods to the freewheel system using the movement transmission system.

36. The device according to claim 34, wherein the cross-bar is selectively connected to the shaft to transmit rotational movement of the cross-bar to the freewheel system using the movement transmission system.

37. The device according to claim 34, wherein each of the operating rods rotatable about an opposing end of the cross-bar; and
extension rods, an end of each of the extension rods rotatable about an opposing end of one of the operating rods, the extension rods being connected in an articulated manner with the shaft.

38. The device according to claim 1, wherein the movement transmission system comprises selectively interconnected gears and cable pulls.

39. The device according to claim 1, the seat backrest drive mechanism including:
a shaft positioned relative to the seat surface of the seat backrest; and
a transmission means adapted to transmit the drive of the seat backrest drive mechanism.

40. The device according to claim 1, including the seat surface drive mechanism and the hand-powered drive mechanism.

41. The drive according to claim 1, wherein the movement transmission system comprises hydraulic transmission means.

42. The device according to claim 2, wherein the pedals (1.1) of the foot-powered drive mechanism (1) move linearly.

43. The device according to claim 5, wherein the pedals (1.1) of the foot-powered mechanism (1) move linearly.

* * * * *

UNITED STATES PATENT AND TRADEMARK OFFICE
CERTIFICATE OF CORRECTION

PATENT NO.  : 5,354,083
DATED       : October 11, 1994
INVENTOR(S) : Qingshan Liu It is certified that error appears in the above—identified patent and that said Letters Patent is hereby corrected as shown below:

Column 11, line 4, "drive" is deleted and replaced with --device--.

Signed and Sealed this

Seventeenth Day of January, 1995

Attest:

BRUCE LEHMAN

Attesting Officer          Commissioner of Patents and Trademarks